United States Patent
Tanaka et al.

(10) Patent No.: US 7,096,116 B2
(45) Date of Patent: Aug. 22, 2006

(54) VEHICLE BEHAVIOR DETECTOR, IN-VEHICLE PROCESSING SYSTEM, DETECTION INFORMATION CALIBRATOR, AND IN-VEHICLE PROCESSOR

(75) Inventors: Hiroki Tanaka, Takahama (JP); Kiyoshi Tsurumi, Obu (JP)

(73) Assignee: Denso Corporation, Kariya (JP)

(*) Notice: Subject to any disclaimer, the term of this patent is extended or adjusted under 35 U.S.C. 154(b) by 152 days.

(21) Appl. No.: 10/747,448

(22) Filed: Dec. 30, 2003

(65) Prior Publication Data

US 2004/0148093 A1     Jul. 29, 2004

(30) Foreign Application Priority Data

Jan. 27, 2003  (JP)  .............................. 2003-017751
May 19, 2003  (JP)  .............................. 2003-140654

(51) Int. Cl.
G01C 21/26   (2006.01)
G01S 1/00    (2006.01)

(52) U.S. Cl. ...................... 701/200; 701/213; 701/220; 342/357.06

(58) Field of Classification Search ................ 701/200, 701/207–211, 213–214, 23, 205; 342/357.01, 342/357.06, 357.12, 357.13, 457, 463; 340/988, 340/995.1, 995.14

See application file for complete search history.

(56) References Cited

U.S. PATENT DOCUMENTS 5,075,693 A * 12/1991 McMillan et al. .......... 342/457
5,774,824 A *  6/1998 Streit et al. ................. 701/207
5,974,359 A    10/1999 Ohkubo

FOREIGN PATENT DOCUMENTS

| EP | 1162465 A1   | 2/2000  |
|----|--------------|---------|
| JP | A-S62-261011 | 11/1987 |
| JP | H04-142480   | 5/1992  |
| JP | A-H05-209756 | 8/1993  |
| JP | A-H06-324138 | 11/1994 |
| JP | A-2000-214180| 8/2000  |

\* cited by examiner

*Primary Examiner*—Yonel Beaulieu
(74) *Attorney, Agent, or Firm*—Posz Law Group, PLC (57) ABSTRACT

A vehicle behavior detector obtains detection information from autonomous sensors to detect a change in vehicle behavior. The detection information is calibrated based on position, bearing, and vehicle speed information obtained from a GPS receiver. For example, the vehicle behavior detector calibrates detection information obtained from the vehicle speed sensor and the angular speed sensor with a Kalman filter process. It is difficult to use only the autonomous sensors to calibrate characteristics changes due to individual sensor differences, environmental changes, and aged deterioration. With using GPS information for calibration, the vehicle behavior detector can accurately detect the vehicle behavior. The accuracy is improved for detection information itself to be output from the vehicle behavior detector to external apparatuses. Using this calibrated detection information, the external apparatuses can perform processes appropriately.

31 Claims, 5 Drawing Sheets

VEHICLE BEHAVIOR DETECTOR, IN-VEHICLE PROCESSING SYSTEM, DETECTION INFORMATION CALIBRATOR, AND IN-VEHICLE PROCESSOR

CROSS REFERENCE TO RELATED APPLICATIONS

This application is based on and incorporates herein by reference Japanese Patent Applications No. 2003-17751 filed on Jan. 27, 2003 and No. 2003-140654 filed on May 19, 2003.

FIELD OF THE INVENTION

The present invention relates to a technology and the like for calibrating detection information from an autonomous sensor in order to detect changes in vehicle behaviors based on information positioned by a radio navigation positioning unit such as GPS.

BACKGROUND OF THE INVENTION

Conventionally, a specific autonomous sensor is mounted on various in-vehicle devices, especially on vehicle controllers for sensing vehicle's behavior information. As an example, a car navigation apparatus uses a dead reckoning navigation method. This method detects vehicle's position, bearing, speed, and the like using outputs from a relative bearing sensor such as a gyroscope, a steering sensor, a wheel sensor, etc. and a distance sensor such as a vehicle speed sensor, a wheel speed sensor, etc. The relative bearing sensor detects vehicle's bearing variations. The distance sensor detects vehicle's speeds (distances). These autonomous sensors make it difficult to calibrate characteristics changes due to individual sensor differences, environmental changes, and aged deterioration. The autonomous sensor has been thereby used merely as an ambiguous information input unit dependent on characteristics of the sensor itself. For example, the car navigation apparatus, one of in-vehicle devices, causes an error because outputs (position, bearing, speed, etc.), from the dead reckoning navigation, contain a sensor error. Since, in particular, positions and bearings are integrally obtained, errors increase gradually.

If a navigation apparatus has a GPS-based calibration function, the GPS is used to calibrate autonomous sensors. Accordingly, it is possible to calibrate characteristics changes in various autonomous sensors and accurately calculate various vehicle behaviors.

On the other hand, information from the GPS is used for vehicle controllers other than the car navigation apparatus. For example, the GPS provides the vehicle's absolute position. This position determines a traveling environment. Based on this traveling environment, vehicle's traveling state is controlled. That is to say, there is provided one or more pieces of various information about the traveling environment such as which road the vehicle is traveling, which latitude, longitude, and height correspond to the traveling location, and how the road is conditioned ahead. This information can be used to reflect the traveling environment on control of driving and traveling states in control systems for vehicle's wheels, traveling, and engine (e.g., see patent document 1). It is also known that the GPS information is used to learn neutral positions for sensors such as steering sensors and yaw-rate sensors that obtain measured values by assuming the vehicle's straight movement to be a neutral position. Such sensor uses GPS-generated vehicle's positions and map database to calculate a curve radius R for a route where the vehicle is traveling. Based on the curve radius R, the sensor determines whether the traveling route is straight or curved. Based on the determination result, the sensor learns the neutral position (e.g., see patent document 2).

[Patent Document 1]
JP-A-H6-324138
[Patent Document 2]
JP-A-2000-214180

However, the car navigation apparatus is disposed in a dashboard together with the other many devices and structures. Generally, the car navigation apparatus is mounted slantwise against the vehicle's horizontal direction. That is to say, attaching importance to the layout necessitates relaxing the installation requirements. Consequently, the car navigation apparatus cannot provide its original accuracy.

On the other hand, the use of GPS is limited for vehicle controllers other than the above-mentioned car navigation apparatus. Based on the GPS-generated vehicle's absolute value, a user simply references the map data for understanding the current route situations. Accordingly, the above-mentioned situations basically remain unsolved. That is to say, the autonomous sensors make it difficult to calibrate characteristics changes due to individual sensor differences, environmental changes, and aged deterioration. The autonomous sensor has been used merely as an ambiguous information input unit dependent on characteristics of the sensor itself.

SUMMARY OF THE INVENTION

It is therefore an object of the present invention to be able to highly accurately detect vehicle behaviors.

To achieve the above and other objects, a vehicle behavior detector provided in a vehicle is provided with the following. An autonomous sensor is provided for detecting information relating to a change in behavior of the vehicle. A radio navigation positioning unit is provided for obtaining information for positioning the vehicle. Detection information from the autonomous sensor is calibrated by using the information from the radio navigation positioning unit. The calibrated detection information is output to an external apparatus which performs a process using the output detection information.

As mentioned above, it is difficult to rely only upon the autonomous sensor to calibrate characteristics changes due to individual sensor differences, environmental changes, and aged deterioration. In the present invention, information detected from the autonomous sensor is calibrated by being filtered using information positioned by a radio navigation positioning unit. Accordingly, a vehicle behavior detector according to the present invention can highly accurately detect vehicle behaviors. The accuracy is improved for detection information itself to be output from the vehicle behavior detector to external apparatuses. Using this detection information, the external apparatuses can perform specified processes more appropriately.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Embodiments of the present invention will be described in further detail with reference to the accompanying drawings. It is to be distinctly understood that the present invention is not limited to the following embodiments but may be otherwise variously embodied within the spirit and scope of the invention.

Figure 1:
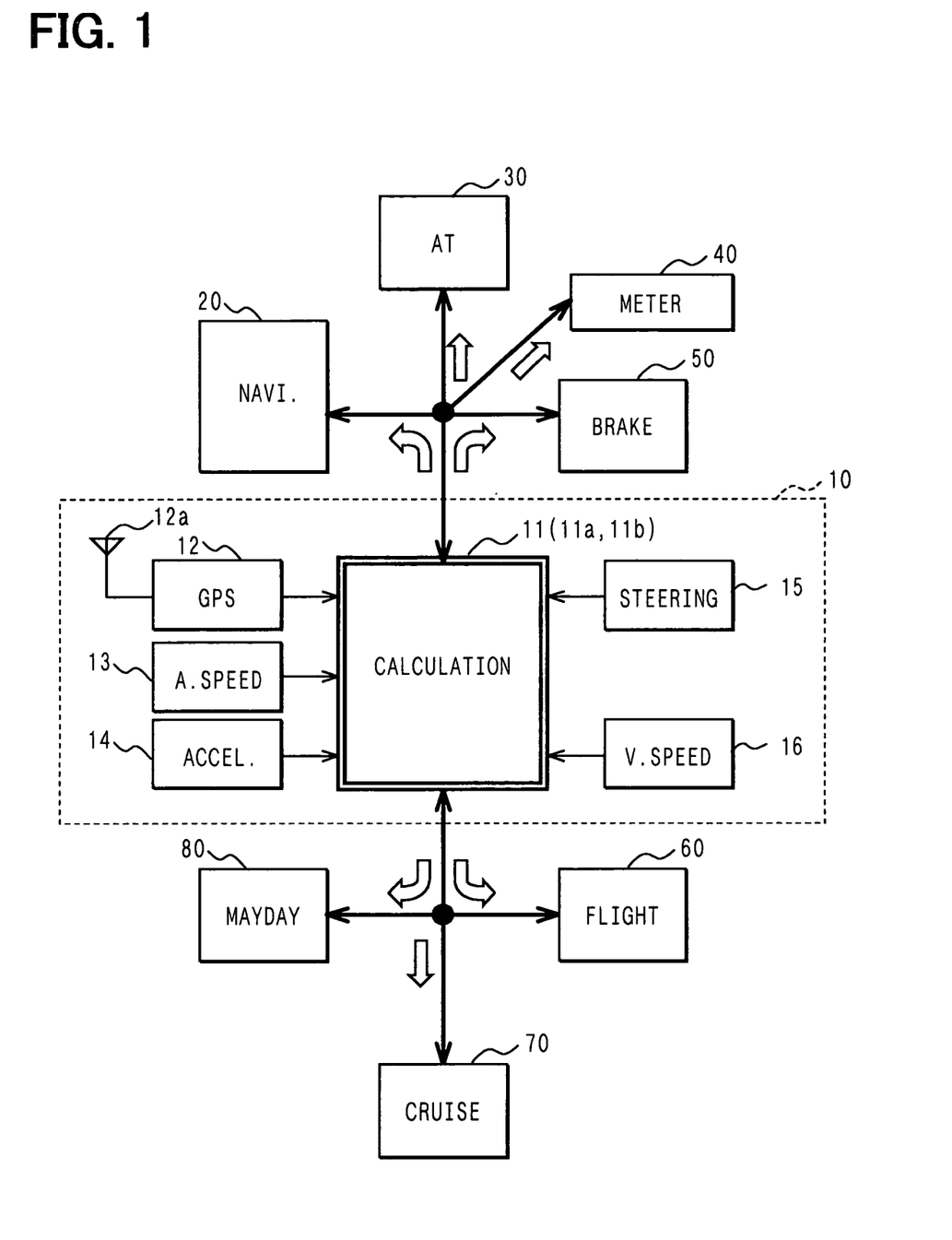
FIG. 1 is a block diagram outlining an in-vehicle processing system according to an embodiment of the present invention.

FIG. 1 is a block diagram outlining an in-vehicle processing system according to an embodiment.

The in-vehicle processing system according to the embodiment comprises a vehicle behavior detector 10 and seven external apparatuses to perform specified processes using detection information output from the vehicle behavior detector 10. The seven external apparatuses include a navigation apparatus 20, an AT control apparatus 30, a meter apparatus 40, a brake control apparatus 50, a flight recorder apparatus 60, a cruise control apparatus 70, and a Mayday apparatus 80. While the embodiment exemplifies the seven external apparatuses, the present invention can be applied to the other apparatuses that perform specified processes using the detection information output from the vehicle behavior detector 10.

[Description of the External Apparatuses 20 to 80]

The navigation apparatus 20 performs a navigation process such as map display, map matching, route search, and route guidance.

The AT control apparatus 30 controls an automatic transmission.

The meter apparatus 40 uses a display apparatus to display various vehicle states such as vehicle speeds, engine revolutions, door open/close states, and transmission's shift ranges.

The brake control apparatus 50 controls slippage when a vehicle is braked. The brake control apparatus 50 controls a brake actuator that provides duty control over opening and closing a pressure intensifying control valve and a pressure reducing control valve provided for a hydraulic brake circuit to control brake forces.

When an accident occurs, for example, the flight recorder apparatus 60 records vehicle behaviors used for analyzing causes of the accident.

The cruise control apparatus 70 is a travel control apparatus to provide so-called cruise control. When there is a vehicle running ahead, the cruise control apparatus 70 controls a distance between two vehicles to automatically allow the vehicle concerned to follow the preceding vehicle. When there is no vehicle running ahead, the cruise control apparatus 70 provides speed control (constant-speed travel control) to drive the vehicle concerned at a specified constant speed.

The Mayday apparatus 80 contains a data communication apparatus (not shown) for wireless data communication with an emergency center. When a specified emergency occurs, the Mayday apparatus 80 transmits the following to the emergency center, i.e., position and speed information and images near the vehicle. The position and speed information is available as the detection information output from the vehicle behavior detector 10. The images near the vehicle are obtained from an imaging apparatus (not shown) to capture vehicle's surroundings.

[Description of the Vehicle Behavior Detector 10]

The vehicle behavior detector 10 comprises a vehicle behavior calculation apparatus 11 and an autonomous sensor for detecting changes in the vehicle behavior. Here, the autonomous sensor includes a GPS (Global Positioning System) receiver 12, an angular speed sensor (gyroscope) 13, a forward/backward acceleration sensor 14, a steering sensor 15, and a vehicle speed sensor 16. The GPS receiver 12 receives a radio wave transmitted from a GPS satellite via a GPS antenna 12a. The GPS receiver 12 functions as a radio navigation positioning unit to detect vehicle's positions, bearings (traveling directions), speeds, and the like. The angular speed sensor (gyroscope) 13 outputs a detection signal equivalent to an angular speed of the revolving movement applied to the vehicle. The forward/backward acceleration sensor 14 detects an acceleration in the forward/backward direction of the vehicle. The steering sensor 15 detects variations of steering wheel's steering angles. The vehicle speed sensor 16 outputs pulse signals at intervals corresponding to the vehicle's traveling speed.

An apparatus body (not shown) of the vehicle behavior calculation apparatus 11 contains not only the above-mentioned vehicle behavior calculation apparatus 11, but also the GPS receiver 12, the angular speed sensor 13, and the forward/backward acceleration sensor 14. The GPS antenna 12a is provided outside the apparatus body. For example, the GPS antenna 12a is mounted at the bottom of a rear window or a front window shield, i.e., at a location where radio waves can be easily received. The steering sensor 15 and the vehicle speed sensor 16 are also disposed outside the apparatus body.

As mentioned above, the apparatus body contains the angular speed sensor 13 and the forward/backward acceleration sensor 14. The angular speed sensor 13 and the forward/backward acceleration sensor 14 are positioned in the vehicle with reference to the vehicle's vertical or horizontal axis. Accordingly, the apparatus body needs to be disposed at a position where the angular speed sensor 13 and the forward/backward acceleration sensor 14 can be disposed ideally. Specifically, the apparatus body needs to be mounted accurately parallel to a vehicle floor surface. In this manner, the built-in angular speed sensor 13 can accurately detect an angular speed of the revolving movement applied to the vehicle. The built-in forward/backward acceleration sensor 14 can accurately detect an acceleration in the vehicle's forward/backward direction.

The vehicle behavior calculation apparatus 11 of a calibration unit is configured as an ordinary computer. The vehicle behavior calculation apparatus 11 contains a known CPU, ROM, RAM, I/O, buses connecting these components with each other, and the like. The vehicle behavior calculation apparatus 11 is supplied with detection information from the autonomous sensors such as the angular speed sensor 13, the forward/backward acceleration sensor 14, the steering sensor 15, and the vehicle speed sensor 16. In addition, the vehicle behavior calculation apparatus 11 is supplied with positioning information obtained by the GPS receiver 12. The vehicle behavior calculation apparatus 11 filters the input information using the positioning information obtained by the GPS receiver 12 to calibrate the detection information from the autonomous sensors. The embodiment uses a Kalman filter for calibration.

Figure 2:
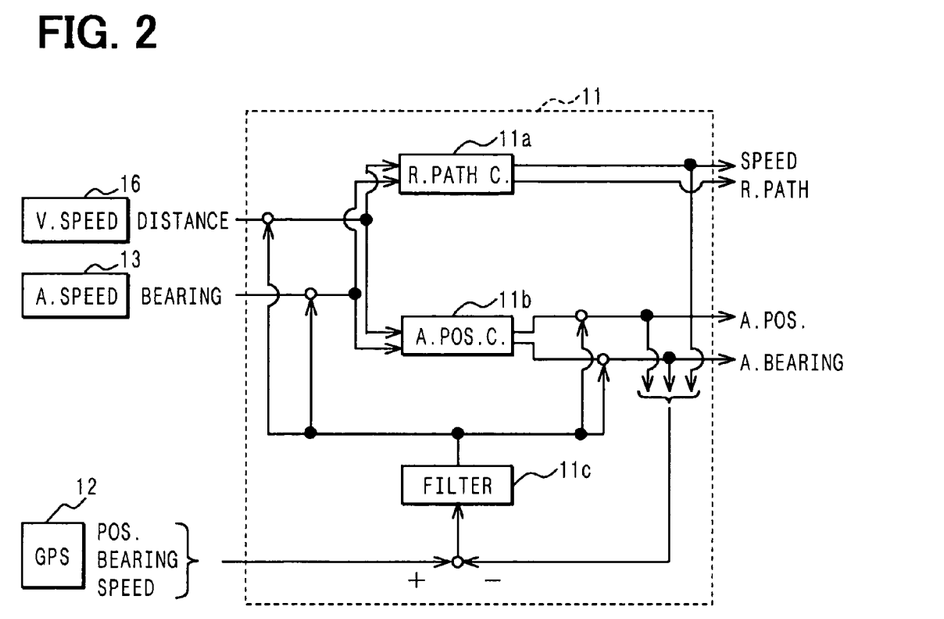
FIG. 2 is a block diagram partly showing functions in a vehicle behavior calculation apparatus according to the embodiment.

FIG. 2 shows a configuration for calibrating, using the Kalman filter 11c, the detection information obtained from the angular speed sensor 13 and the vehicle speed sensor 16 in the above-mentioned autonomous sensors. The vehicle behavior calculation apparatus 11 uses a relative path calculation section 11a and an absolute position calculation section 11b to perform calculations based on signals from the vehicle speed sensor 16 and the angular speed sensor 13. These calculations (dead reckoning navigation calculations) output a vehicle speed, a relative path, an absolute position, and an absolute bearing. The GPS receiver 12 outputs a position, a bearing, and a vehicle speed. The Kalman filter 11c corrects a distance coefficient for the vehicle speed sensor 16, an offset of the angular speed sensor 13, an absolute position, and an absolute bearing. To do this, the Kalman filter 11c uses the information of the vehicle speed, the absolute position, and the absolute bearing obtained from the dead reckoning navigation and the information of the vehicle speed, the position, and the bearing from the GPS receiver 12.

[Kalman Filter Overview]

Figure 3:
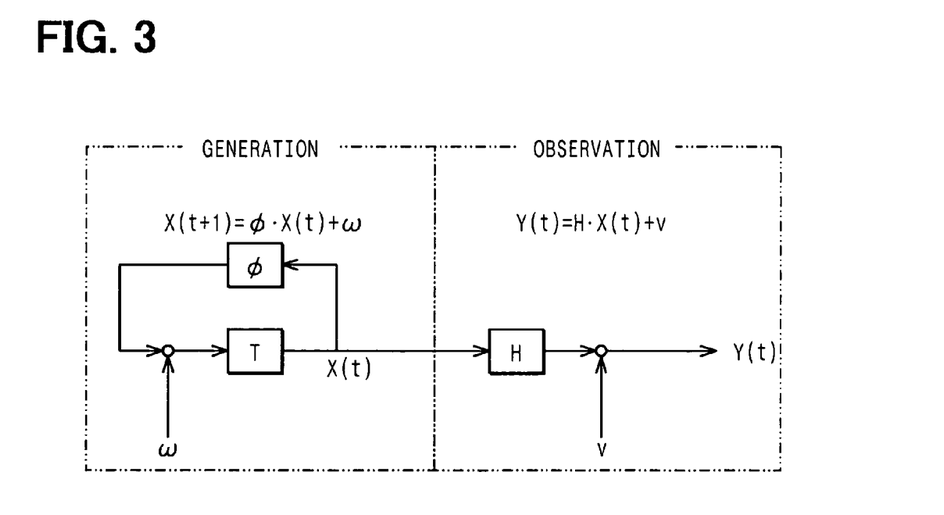
FIG. 3 is a configuration diagram showing a model of the Kalman filter.

The following outlines the Kalman filter 11c. As shown in FIG. 3, the Kalman filter 11c is divided into a signal generation process and an observation process. FIG. 3 uses a linear system ($\phi$). Let us assume that part of system state X(t) can be observed and the part is associated by an observed matrix H. In this case, the Kalman filter 11c yields an optimum estimate of X(t). In FIG. 3, the reference symbol $\omega$ represents a noise generated in the signal generation process. The reference symbol v denotes a noise generated in the observation process. An input to the filter is Y(t). An output therefrom is an optimum estimate for X(t).

The following equation is used to find state quantity X(t|t), i.e., an optimum estimate for state X using the information up to time t.

$$X(t|t)=X(t|t-1)+K(t)[Y(t)-HX(t|t-1)] \quad \text{Equation 1}$$

where X(t|t−1) is the predetermined estimate, and K(t) the Kalman gain, both being expressed by the following equations 2 and 3.

$$X(t|t-1)=\phi X(t-1|t-1) \quad \text{Equation 2}$$

$$K(t)=P(t|t-1)H^T(HP(t|t-1)H^T+V)^{-1} \quad \text{Equation 3}$$

where P is the error covariance of state quantity X, P(t|t−1) is the error covariance estimate, and P(t−1|t−1) is the error covariance. Each of them is expressed by the following equations 4 and 5.

$$P(t|t-1)=\phi P(t-1|t-1)\phi T+W \quad \text{Equation 4}$$

$$P(t-1|t-1)=(I-K(t-1)H)P(t-1|t-2) \quad \text{Equation 5}$$

where V is the dispersion of noise v generated in the observation process, W is the dispersion of noise $\omega$ generated in the signal generation process, and A(i|j) is the estimate of A at time i based on the information up to time j. The superscript $^T$ denotes the transposed matrix and $^{-1}$ the inverse matrix. The symbol I indicates the identity matrix.

The symbols V and W are average-0 Gaussian random noises which are uncorrelated to each other. In the above-mentioned Kalman filter 11c, appropriate errors are supplied to initial values for state quantity X and error covariance P. Repeating the above-mentioned calculations for each observation improves the accuracy of state quantity X. The present embodiment applies the Kalman filter 11c to the dead reckoning navigation.

The definition of the signal generation process will now be described. The Kalman filter 11c aims at correcting errors in the dead reckoning navigation. Accordingly, state quantity X defines the following five error values. Process matrix $\phi$ provides a time change in the error value.

(a) Offset Error ($\epsilon$G)

$$\epsilon G_t = \epsilon G_{t-1} + \omega_0$$

There is no deterministic change. A noise is added to the most recent error.

(b) Absolute Bearing Error ($\epsilon$A)

$$\epsilon A_t = T \times \epsilon G_{t-1} + \epsilon A_{t-1} + \omega_1$$

A bearing error and a noise are added to the most recent error. The bearing error is found by multiplying an offset error and a time lapse from the most recent observation.

(c) Distance Coefficient Error ($\epsilon$K)

$$\epsilon K_t = \epsilon K_{t-1} + \omega_2$$

There is no deterministic change. A noise is added to the most recent error.

(d) Northward Error for Absolute Position ($\epsilon$Y)

$$\epsilon Y_t = \sin(A_t + \epsilon A_{t-1} + \epsilon G_{t-1} \times T/2) \times L \times (1+\epsilon K_{t-1}) - \sin(A_t) \times L + \epsilon Y_{t-1}$$

The most recent error is supplied with an error caused by a bearing error and a distance error.

(e) Eastward Error for Absolute Position ($\epsilon$X)

$$\epsilon X_t = \cos(A_t + \epsilon A_{t-1} + \epsilon G_{t-1} \times T/2) \times L \times (1+\epsilon K_{t-1}) - \cos(A_t) \times L + \epsilon X_{t-1}$$

The most recent error is supplied with an error caused by a bearing error and a distance error. In the above-mentioned definition, the symbol $A_t$ represents the true absolute bearing, L represents the traveled distance from the most recent observation, and T represents the elapsed time from the most recent observation.

The signal generation process is defined by partially differentiating and linearizing the above-mentioned equations with the state quantity.

The definition of the above-mentioned observation process will now be described. An observed value is found from a difference between an output from the dead reckoning navigation and an output from the GPS receiver 12. Each output contains an error. The observed value provides the sum of the dead reckoning navigation error and the GPS error. The signal generation process is defined by associating observed value Y with state quantity X.

The use of this Kalman filter zeros predetermined estimate X(t|t−1) in equation 2 in accordance with the distance coefficient correction for the vehicle speed sensor 16, and the offset, absolute bearing, and absolute position corrections for the angular speed sensor 13. Therefore, equation 1 is modified to the following equation 6.

$$X(t|t)=K(t)Y(t) \quad \text{Equation 6}$$

Consequently, state quantity X according to the five error values defined in the signal generation process is found by Kalman gain K(t) and observed value Y(t) found by equations 3 to 5.

It is recommended to refer to JP-A-H8-068654 (JP-3218876B2) for further details about the Kalman filter 11c.

[Example of Operations Performed on the Vehicle Behavior Calculation Apparatus 11]

As shown in FIG. 2, the vehicle behavior calculation apparatus 11 performs the relative path calculation, the absolute position calculation, and the Kalman filter processing. The following describes these operations.

Figure 4:
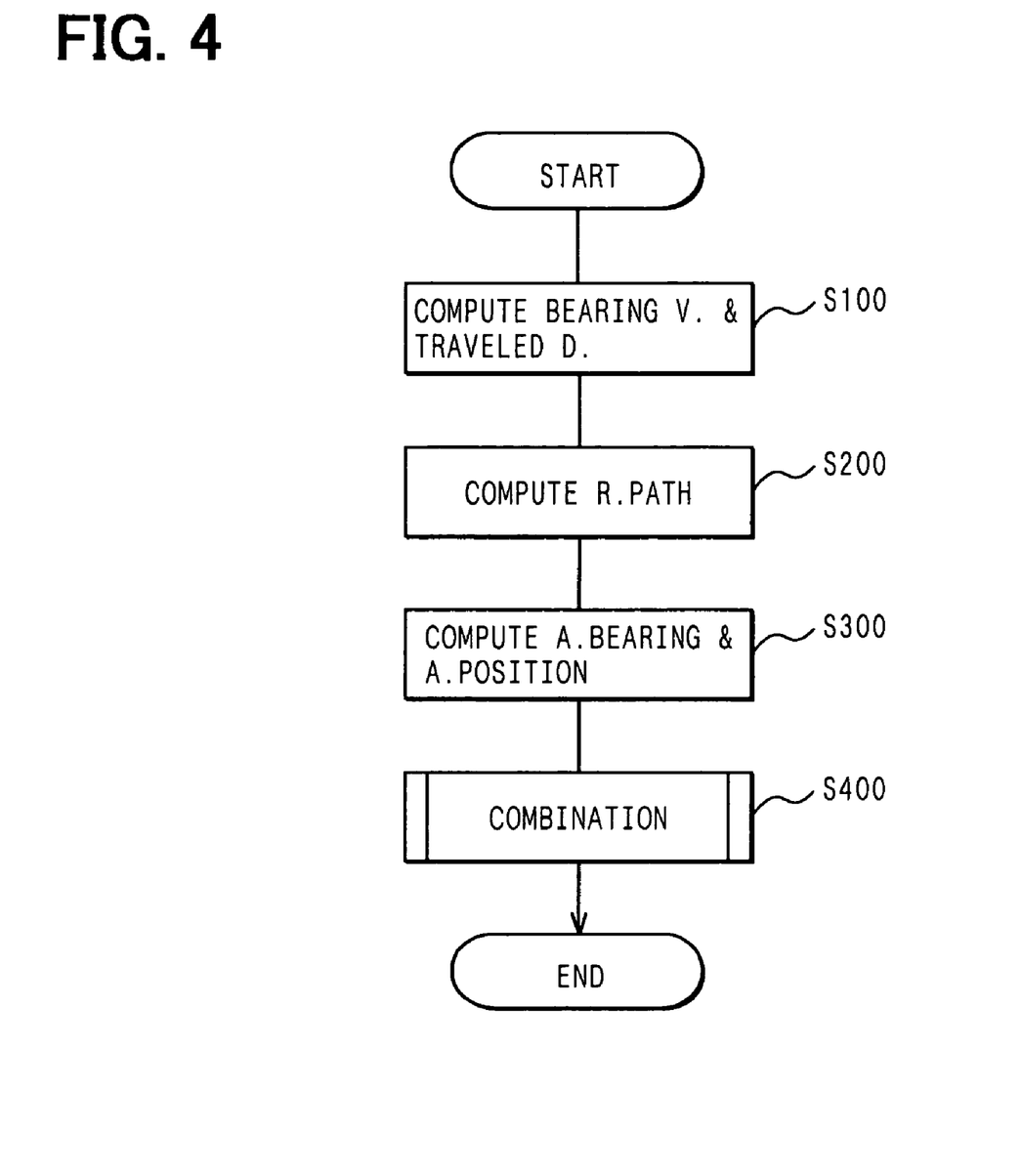
FIG. 4 is a flowchart showing a calculation example of the vehicle behavior calculation.

FIG. 4 is a flowchart showing an operation process as an example of the vehicle behavior operation.

At first Step 100, the process calculates a bearing variation and a traveled distance. The process first finds the bearing variation by multiplying an output angular speed from the angular speed sensor 13 and activation cycle T of the process routine in FIG. 4. The process then subtracts a result of multiplying the offset correction amount (to be described later) by activation cycle T for the main routine from the bearing variation. In this manner, the process performs offset correction of the bearing variation. The process then multiplies a vehicle speed pulse count from the vehicle speed sensor 16 by a distance coefficient (to be described later) to calculate the traveled distance.

Next to Step 100, the process performs the relative path calculation at Step 200. The process first updates the relative bearing based on the bearing variation (found at Step 100). The process updates the relative position coordinates using the updated relative bearing and the traveled distance found at Step 100. This update is performed by adding the relative bearing's X and Y components against the traveled distance to the most recent relative position coordinates. The relative position coordinates are updated in order to find a relative path.

Next to Step 200, the process calculates the absolute bearing and the absolute position at Step 300. The process first updates the absolute bearing based on the bearing variation (found at Step 100). The process updates the absolute position coordinates according to the updated absolute bearing and the traveled distance found at Step 100. Absolute bearing A and the absolute position updated at Step 300 are used for the process of combination with the GPS at Step 400.

Figure 5:
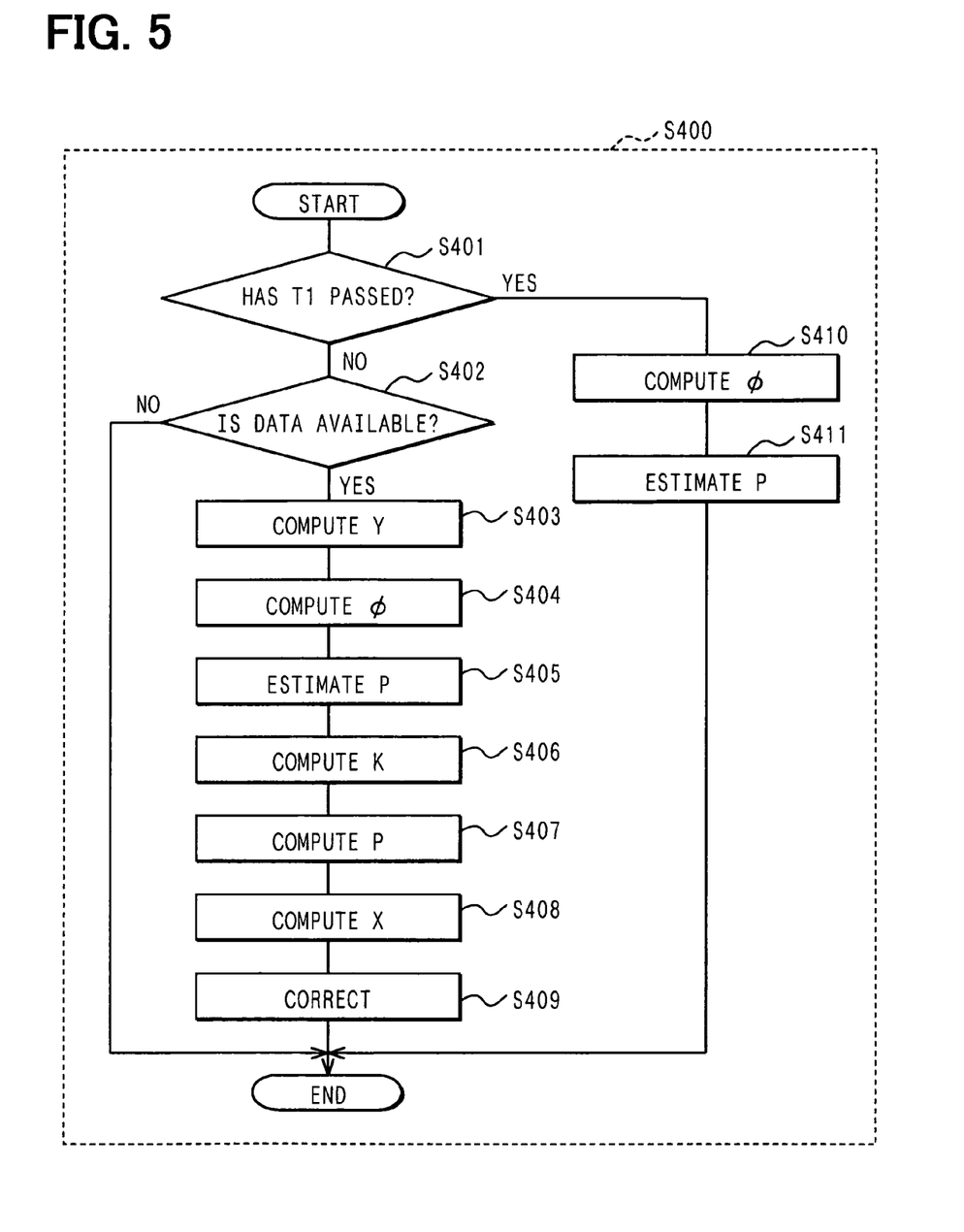
FIG. 5 is a flowchart showing a process combined with the GPS.

The following describes in details the process of combination with the GPS at Step 400 with reference to the flowchart in FIG. 5.

At first Step 401, the process determines whether or not specified time T1 (in seconds) has passed since the most recent positioning or estimated calculation. This step is provided for the following reason. A dead reckoning navigation error is corrected from Steps 403 to 409 each time the GPS receiver 12 performs positioning. However, when the GPS receiver 12 is incapable of positioning, a large error is generated. The corresponding estimated calculation is therefore performed for the error at Steps 410 and 411.

When T1 seconds have not passed after the most recent positioning or estimated calculation (NO at Step 401), it is determined at Step 402 whether or not positioning data is available from the GPS receiver 12. When positioning data is available from the GPS receiver 12 (YES at Step 402), control advances to the calculation of the Kaman filter at Step 403 and later. First at Step 403, the process calculates observed value Y. That is to say, observed value Y is calculated from the speed, position, and bearing data output from the GPS receiver 12, the absolute bearing and the absolute position found by the process at Step 300 (see FIG. 4) in the dead reckoning navigation, and the vehicle speed found by a speed calculation process (not shown) based on vehicle speed pulses from the vehicle speed sensor 1.

Further, the process calculates noise v generated in the observation process based on positioning data from the GPS receiver 12.

At Step 404, process matrix $\Phi$ is calculated. The calculation of process matrix $\Phi$ uses traveled distance L and elapsed time T from the point of calculating the most recent process matrix, and absolute bearing A found at Step 300. Traveled distance L and elapsed time T are separately found by a measurement process (not shown). Based on observed value Y and process matrix $\phi$ calculated in this manner, equations 3 to 5 are performed to find state quantity X in equation 6. That is to say, at Step 405, equation is performed estimated calculation of error covariance P. At Step 406, equation 4 is performed to calculate Kalman gain K. At Step 407, equation 5 is performed to calculate error covariance P. Then, at Step 408, equation 6 is performed to find state quantity X based on Kalman gain K and observed value Y.

State quantity X represents an offset error ($\epsilon G$), an absolute bearing error ($\epsilon A$), a distance coefficient error ($\epsilon K$), a northward error for absolute position ($\epsilon Y$), and an eastward error for absolute position ($\epsilon X$). These errors are used for correction at Step 409 in FIG. 5 to correct dead reckoning navigation errors, i.e., to correct the offset of the angular speed sensor 13, and the distance coefficient, the absolute bearing, and the absolute position of the vehicle speed sensor 16. The correction is executed by the following equations:

Offset correction amount=Offset correction amount−$\epsilon G$

Distance coefficient=Distance coefficient×(1−$\epsilon K$)

Absolute bearing=Absolute bearing−$\epsilon A$

Absolute position $y$=Absolute position $y$−$\epsilon Y$

Absolute position $x$=Absolute position $x$−$\epsilon X$

The offset correction for the angular speed sensor 13 modifies the offset correction quantity used for calculations of the bearing variation and the traveled distance at Step 100 in FIG. 2. The distance coefficient correction for vehicle speed sensor 16 modifies the distance coefficient also used at Step 100. The absolute bearing correction modifies absolute bearing A used at Step 300 in FIG. 2. The absolute position correction modifies the absolute position also used at Step 300.

The above-mentioned processes are repeated to correct the corresponding errors each time positioning data is available from the GPS receiver 12. This makes it possible to obtain more accurate dead reckoning navigation data. There may be a case where the GPS receiver 12 is incapable of positioning (NO at Step 402) and T1 seconds have not yet passed after the most recent positioning or estimated calculation (YES at Step 401). In this case, control advances to Steps 410 and 411 to calculate process matrix $\Phi$ and perform an estimated calculation for error covariance P. In this manner, the estimated calculation is available for the error covariance in the event of an error when the GPS receiver 12 is incapable of positioning. It is possible to provide an accurate Kalman filter process to be performed when the GPS receiver 12 becomes capable of positioning thereafter.

The vehicle behavior calculation apparatus 11 uses the relative path calculation section 11a and the absolute position calculation section 11b for calculations based on signals from the vehicle speed sensor 16 and the angular speed sensor 13 to obtain the vehicle speed, the relative path, the absolute position, and the absolute bearing. The vehicle behavior calculation apparatus 11 filters these pieces of obtained data based on the position, bearing, and vehicle speed information obtained from the GPS receiver 12. Consequently, the vehicle behavior calculation apparatus 11 corrects the distance coefficient of the vehicle speed sensor 16, the offset of the angular speed sensor 13, the absolute position, and the absolute bearing. The calibrated detection information is output to external apparatuses such as the navigation apparatus 20, the AT control apparatus 30, the meter apparatus 40, the brake control apparatus 50, the flight recorder apparatus 60, the cruise control apparatus 70, and the Mayday apparatus 80 via an input/output circuit (not shown) in the vehicle behavior calculation apparatus 11.

In FIG. 2, there has been described only the calibration of the detection information obtained from the vehicle speed sensor 16 and the angular speed sensor 13. The calibration is also performed for the other autonomous sensors such as the forward/backward acceleration sensor 14 and the steering sensor 15 based on the position, bearing, and vehicle speed information obtained from the GPS receiver 12. Further, the steering sensor 15 may be subject to the calibration of detection information (i.e., steering angle information) used for the neutral position learning. The position and bearing information, etc. obtained from the GPS receiver 12 is used to determine that the steering position is neutral, i.e., the vehicle travels straight. The calibration uses the steering position in that condition as the neutral position.

The following describes examples of the detection information output from the vehicle behavior detector 10 to the external apparatuses 20 to 80. As shown in FIG. 1, for example, the position and speed information is output to the navigation apparatus 20. The speed and slope (of the road surface) information is output to the AT control apparatus 30 and the meter apparatus 40. The speed and turn information is output to the brake control apparatus 50 and the flight recorder apparatus 60. The position and speed information is output to the cruise control apparatus 70 and the Mayday apparatus 80.

[Effects of the In-Vehicle Processing System According to the Embodiment]

(1) The vehicle behavior detector 10 according to the embodiment calibrates the detection information obtained from the autonomous sensors 13 to 16 that detect changes in the vehicle behavior. The calibration is based on the position, bearing, and vehicle speed information obtained from the GPS receiver 12. In the above-mentioned example, the Kalman filter is applied to the detection information obtained from the vehicle speed sensor 16 and the angular speed sensor 13 for calibration.

It is difficult to use only the autonomous sensors 13 to 16 to calibrate characteristics changes due to individual sensor differences, environmental changes, and aged deterioration. Since the embodiment uses the GPS information for calibration, the vehicle behavior detector 10 can highly accurately detect the vehicle behavior. The accuracy is improved for detection information itself to be output from the vehicle behavior detector 10 to external apparatuses 20 to 80. Using this detection information, the external apparatuses 20 to 80 can perform specified processes more appropriately.

For example, the prior art cannot keep track of a change in the tire diameter when the tire is worn or is changed to a studless tire. The vehicle speed sensor 16 provides inaccurate detection information such as the distance and the vehicle speed. Consequently, the meter apparatus 40 displays such inaccurate distance and speed. By contrast, the calibration according to the embodiment greatly improves the accuracy of the contents displayed on the meter.

The vehicle speed information is also used for the AT control apparatus 30, the meter apparatus 40, the brake control apparatus 50, the flight recorder apparatus 60, the cruise control apparatus 70, and the Mayday apparatus 80. Solving inaccuracy of the vehicle speed information can provide more accurate control.

When only the sensors are used as conventionally practiced, it has been difficult to correct an offset or a gain of the angular speed sensor 13 and the forward/backward acceleration sensor 14. On the contrary, the calibration using the GPS positioning information enables such correction and makes it possible to accurately detect angular speeds and forward/backward acceleration. Inaccuracy of the sensor information can be solved in the AT control apparatus 30, the meter apparatus 40, the brake control apparatus 50, the flight recorder apparatus 60, the cruise control apparatus 70, and the Mayday apparatus 80. More accurate control can be provided.

It is also possible to improve accuracy of the steering angle information obtained from the steering sensor 15 as follows. Using the positioning information of the GPS receiver 12, the angular speed sensor 13 outputs a highly accurate angular speed by correcting offsets and gains. The vehicle speed sensor 16 provides an accurate speed. A turning radius of the traveling vehicle can be accurately estimated by combining the accurate speeds from the angular speed sensor 13 and the vehicle speed sensor 16. The estimated turning radius is compared with a steering angle obtained from the steering sensor 15. In this manner, the neutral position learning can be completed fast, highly accurately, and even during a turning travel.

The navigation apparatus 20 can accurately position the vehicle, enabling highly accurate map matching, for example.

(2) The apparatus body of the vehicle behavior calculation apparatus 11 contains not only the vehicle behavior calculation apparatus 11, but also the GPS receiver 12, the angular speed sensor 13, and the forward/backward acceleration sensor 14. The apparatus body is mounted at a position in the vehicle where the angular speed sensor 13 and the forward/backward acceleration sensor 14 can be ideally mounted. This is because the angular speed sensor 13 and the forward/backward acceleration sensor 14 are positioned with reference to the vehicle's vertical or horizontal axis. Since the apparatus body is mounted in this manner, the angular speed sensor 13 can accurately detect an angular speed of the revolving movement applied to the vehicle. The built-in forward/backward acceleration sensor 14 can accurately detect acceleration along the vehicle's forward and backward directions.

A conventional car navigation apparatus contains an angular speed sensor. The car navigation apparatus is disposed in a dashboard together with the other many devices and structures. Consequently, the car navigation apparatus is mounted slantwise against the vehicle's horizontal direction, making it impossible to provide its original accuracy. On the contrary, the navigation apparatus 20 according to the embodiment is mounted as an external apparatus independently of the vehicle behavior detector 10. The navigation apparatus 20 can be even mounted slantwise against the vehicle's horizontal direction without any problems. Conventionally, attaching importance to the layout necessitates relaxing the installation requirements. By contrast, the angular speed sensor 13 according to the embodiment is not contained in the navigation apparatus 20. This makes it possible to prevent the detection accuracy from being sacrificed. Not so much importance needs to be attached to the layout of the vehicle behavior detector 10. By giving precedence to the detection accuracy, the vehicle behavior detector 10 can be disposed at a position where an angular speed can be accurately detected as mentioned above.

(3) According to the embodiment, the single vehicle behavior detector 10 provides detection information used for the external apparatuses 20 to 80. Conventionally, autonomous sensors may be duplicated for various in-vehicle devices and the navigation apparatus. The embodiment can solve the duplicate installation of sensors.

The vehicle behavior detector 10 does not use a user-operated complicated human interface as used for the navigation apparatus 20. This can easily maintain high reliability because there is no need to ensure the reliability resulting from frequent software enhancement.

Furthermore, in this embodiment, a so-called autonomous navigation sensor is formed by combining, with the vehicle behavior detector 10, the GPS receiver 12 and the autonomous sensor such as the angular speed sensor 13 and the vehicle speed sensor 16. The embodiment can thereby calculate the vehicle's position even when the GPS is unavailable. Accordingly, the navigation apparatus 20 is always provided with the position information of the vehicle and traveling path of the vehicle. Furthermore, this is also advantageous from the viewpoint of providing detection information to the Mayday apparatus 80, i.e., an apparatus requiring highly reliable position information. Moreover, the vehicle behavior detector 10 provides highly accurate position and vehicle behavior information. It is also possible to improve the positioning accuracy when a vehicle trouble occurs. For this purpose, the Mayday apparatus 80 provides an external Mayday center with the position and vehicle behavior information. This information is then used for map matching.

[Others]

(a) The above-mentioned embodiment has described the example of performing the Kalman filter process to calibrate the detection information obtained from the vehicle speed sensor 16 and the angular speed sensor 13. The other filter processes may be available. For example, the histogram method may be used to generate a histogram of a difference between information obtained from the GPS positioning and information obtained from the sensors. This method uses a correction value by finding an average of differences within an appropriate learning period.

(b) The above-mentioned embodiment describes the angular speed sensor 13, the forward/backward acceleration sensor 14, the steering sensor 15, and the vehicle speed sensor 16 as autonomous sensor examples. It is also possible to use the other sensors that detect changes in the vehicle behavior. For example, there may be a yaw rate sensor, a pitching sensor, a rolling sensor, and the like that detect the vehicle behavior.

(c) The above-mentioned embodiment represents the GPS as an example of the radio navigation positioning unit. It is also possible to use the other independent radio wave navigation systems such as GLONASS or to use such independent system in combination with the GPS. The other radio wave navigation systems may be used.

Figure 6:
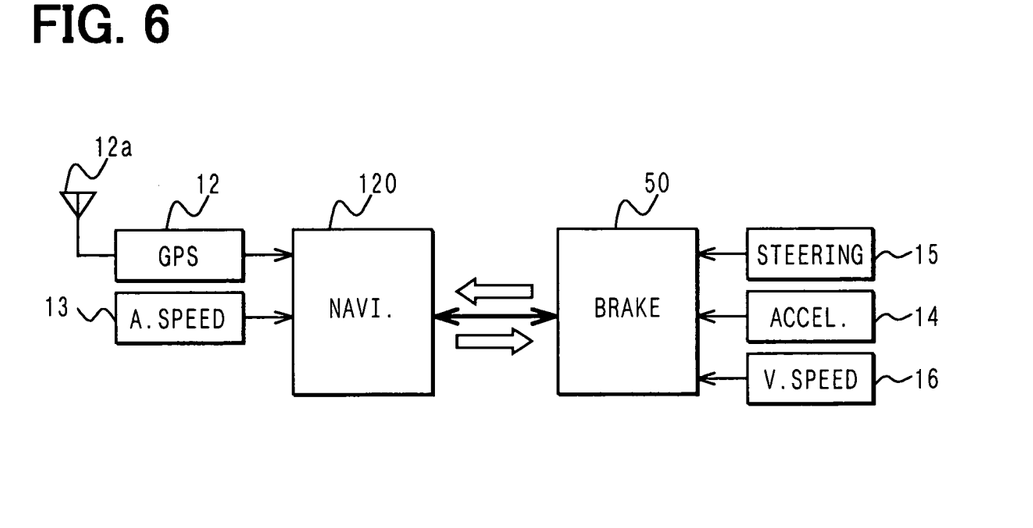
FIG. 6 is a block diagram outlining another embodiment.

(d) The embodiment has been described on the assumption that the vehicle behavior detector 10 and the navigation apparatus 20 are available independently of each other. Further, there may be an embodiment that allows the navigation apparatus to have the functions implemented by the vehicle behavior calculation apparatus 11 in the vehicle behavior detector 10. FIG. 6 shows an example. The same reference numerals are used to represent the same parts in FIG. 6 as those for the embodiment shown in FIGS. 1 and 2.

According to the configuration example in FIG. 6, the GPS receiver 12 and the angular speed sensor (gyroscope) 13 are connected to the navigation apparatus 120. The GPS receiver 12 receives a radio wave transmitted from a GPS satellite via the antenna 12a to detect the vehicle's position, bearing (traveling direction), speed, and the like. The GPS receiver 12 functions as the radio navigation positioning unit. The angular speed sensor 13 outputs a detection signal corresponding to an angular speed of the revolving movement applied to the vehicle.

The navigation apparatus 120 is configured to be capable of data communication with the brake control apparatus 50 via a communication line (e.g., in-vehicle LAN). The brake control apparatus 50 connects with the forward/backward acceleration sensor 14, the steering sensor 15, and the vehicle speed sensor 16. The forward/backward acceleration sensor 14 detects acceleration along the vehicle's forward and backward directions. The steering sensor 15 detects variations of steering wheel's steering angles. The vehicle speed sensor 16 outputs pulse signals at an interval corresponding to the vehicle's traveling speed. Based on the detection information from the sensors 14, 15, and 16, and the other information, the brake control apparatus 50 controls slippage when a vehicle is braked. The brake control apparatus 50 obtains the detection information (steering sensor information) from the steering sensor 15 and sends this information to the navigation apparatus 120 for calibration.

That is to say, the navigation apparatus 120 has the calibration function for the detection information while this function is provided by the vehicle behavior calculation apparatus 11 according to the embodiment shown in FIG. 1 and the like. When receiving the steering sensor information from the brake control apparatus 50, the navigation apparatus 120 filters this information using the positioning information obtained by the GPS receiver 12 to calibrate the steering sensor information. A possible calibration example is correction of the neutral position learning for the steering sensor 15. After performing the calibration in this manner, the navigation apparatus 120 obtains the corrected learning information about the neutral position for the steering sensor. The navigation apparatus 120 then returns this information to the brake control apparatus 50. The brake control apparatus 50 can control the brake using the corrected learning information about the calibrated neutral position for steering. Consequently, it is possible to provide control based on the very accurate vehicle behavior information. According to the embodiment, the navigation apparatus 120 contains the function of the detection information calibrator. In this meaning, the navigation apparatus 120 has the function different from that of the navigation apparatus 20 in FIG. 1.

The brake control apparatus 50 is an example of the vehicle controller. Representative vehicle controllers include vehicle movement controllers such as VSC and ACC. Obviously, the other vehicle controllers may be available. FIG. 6 exemplifies the steering sensor 15 as an autonomous sensor to obtain the detection information about an object to be calibrated. Of course, the other autonomous sensors are applicable.

Figure 7:
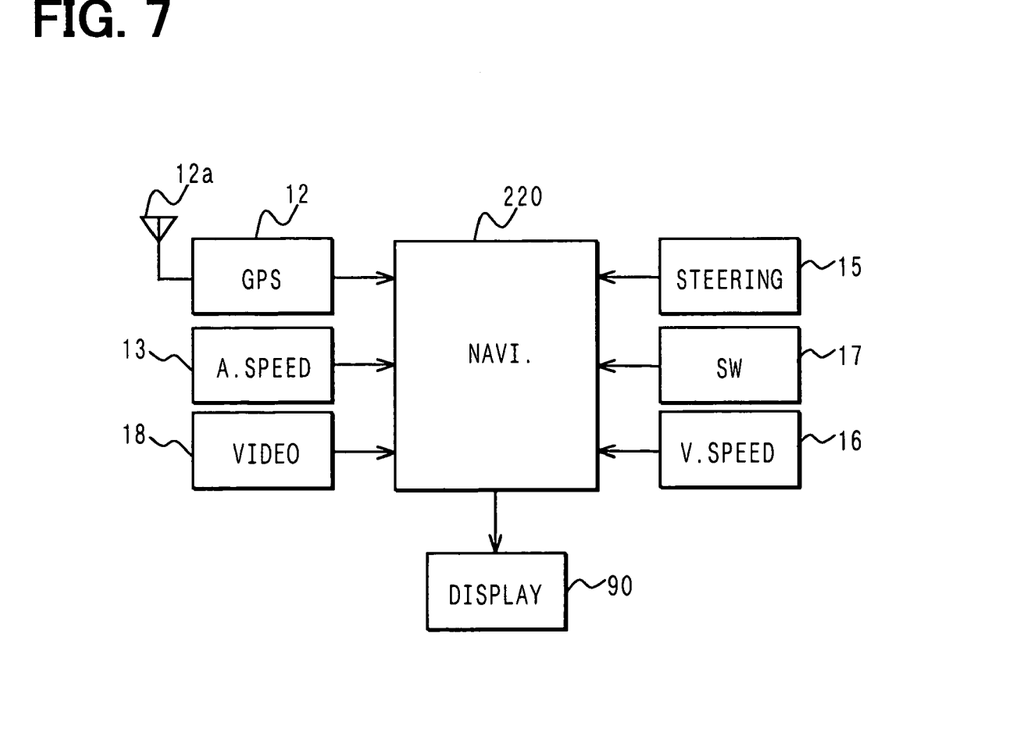
FIG. 7 is a block diagram outlining yet another embodiment.

(e) According to the embodiment in FIG. 6, the navigation apparatus 120 calibrates the detection information (steering sensor information) from the brake control apparatus 50 connected by the communication line. The calibrated detection information is output to the brake control apparatus 50. However, it may be also preferable to calibrate the detection information to be used for a process the navigation apparatus itself performs. FIG. 7 shows an example.

According to a configuration in FIG. 7, a navigation apparatus 220 connects with the GPS receiver 12, the angular speed sensor 13, the steering sensor 15, and the vehicle speed sensor 16. The navigation apparatus 220 also connects with a reverse switch 17 to indicate the vehicle's backward movement, a video input apparatus 18 to supply a view at the rear of the vehicle, and a display device 90. The navigation apparatus 220 according to the embodiment not only performs basic processes such as displaying maps and guiding routes. The navigation apparatus 220 can also perform a parking assistance process using the function to detect and display positions. The parking assistance process facilitates parking operations by backing up a vehicle, for example. To do this, the parking assistance process displays the vehicle's estimated route based on video images at the rear of the vehicle and the steering sensor information. The video input apparatus 18 provides those video images. The steering sensor 15 provides the steering sensor information. In order to accurately perform the parking assistance process, it is effective to correct the neutral position learning for the steering sensor 15 like the case of the brake control apparatus 50 in FIG. 6. Like the navigation apparatus 120, the navigation apparatus 220 according to the present embodiment contains the function to calibrate the detection information. The function calibrates the steering sensor information using the positioning information provided by the GPS. In this manner, the vehicle behavior can be detected accurately. As a result, the parking assistance function can be provided more appropriately. According to the embodiment, the navigation apparatus 220 is used as an in-vehicle processor.

It will be obvious to those skilled in the art that various changes may be made in the above-described embodiments of the present invention. However, the scope of the present invention should be determined by the following claims.

What is claimed is:

1. A vehicle behavior detector provided in a vehicle, comprising:
    an autonomous sensor for detecting information relating to a change in behavior of the vehicle;
    a radio navigation positioning unit for obtaining information for positioning the vehicle;
    a calibration unit for calibrating detection information from the autonomous sensor by processing information relating to a characteristic change of the autonomous sensor using the information from the radio navigation positioning unit; and
    an information output unit capable of outputting the detection information calibrated by the calibration unit to an external apparatus which performs a process using the detection information outputted by the information output unit.

2. The vehicle behavior detector of claim 1,
    wherein the autonomous sensor including at least one of an angular speed sensor and an acceleration sensor is contained in a body of the vehicle behavior detector, and
    wherein the body is disposed at a position in the vehicle where it is possible to ideally dispose the autonomous sensor whose disposition depends on at least one of a vehicle's vertical axis and a vehicle's horizontal axis.

3. The vehicle behavior detector of claim 1,
    wherein the external apparatus is one of a plurality of external apparatuses,
    wherein the autonomous sensor can detect the information used in the plurality of external apparatuses, and
    wherein the information output unit can output the detection information necessary for each of the plurality of external apparatuses.

4. The vehicle behavior detector of claim 1,
    wherein the external apparatus includes a navigation apparatus,
    wherein the autonomous sensor includes an autonomous navigation sensor, and
    wherein the information output unit outputs, to the navigation apparatus, the detection information including at least one of position information of the vehicle and traveling path of the vehicle, both of which are calibrated by the calibration unit.

5. The vehicle behavior detector of claim 4,
    wherein the navigation apparatus can perform map matching.

6. The vehicle behavior detector of claim 1,
    wherein the autonomous sensor includes a turning state sensor for detecting information relating to a turning state of the vehicle, and
    wherein the calibration unit calibrates the detection information for learning a neutral position in the turning state sensor.

7. An in-vehicle processing system comprising:
    an external apparatus for performing a process; and
    a vehicle behavior detector that includes:
        an autonomous sensor for detecting information relating to a change in behavior of the vehicle;
        a radio navigation positioning unit for obtaining information for positioning the vehicle;
        a calibration unit for calibrating detection information from the autonomous sensor by processing information relating characteristic change of the autonomous sensor using the information from the radio navigation positioning unit; and
        an information output unit capable of outputting the detection information calibrated by the calibration unit to the external apparatus,
    wherein the external apparatus performs the process using the detection information outputted by the information output unit.

8. A detection information calibrator capable of communicating with a vehicle controller which provides vehicle control by using detection information from an autonomous sensor that detects information relating to a change in behavior of a vehicle, the detection information calibrator comprising:
    a radio navigation positioning unit for obtaining information for positioning the vehicle;
    an information input unit for accepting the detection information from the vehicle controller;
    a calibration unit for calibrating the detection information from the information input unit by processing information relating characteristic change of the autonomous sensor using the information from the radio navigation positioning unit; and
    an information output unit for outputting the detection information calibrated by the calibration unit to the vehicle controller.

9. A navigation apparatus capable of communicating with a vehicle controller which provides vehicle control by using detection information from an autonomous sensor that detects information relating to a change in behavior of a vehicle, the navigation apparatus comprising:

a navigation unit for performing a navigation process for the vehicle;

a radio navigation positioning unit for obtaining information for positioning the vehicle;

an information input unit for accepting the detection information from the vehicle controller;

a calibration unit for calibrating the detection information from the information input unit by processing information relating to a characteristic change of the autonomous sensor using the information from the radio navigation positioning unit; and an information output unit for outputting the detection information calibrated by the calibration unit to the vehicle controller.

10. An in-vehicle processor provided in a vehicle, comprising:

an autonomous sensor for detecting information relating to a change in behavior of the vehicle;

a radio navigation positioning unit for obtaining information for positioning the vehicle;

a calibration unit for calibrating detection information from the autonomous sensor by processing information relating to a characteristic change of the autonomous sensor using the information from the radio navigation positioning unit; and a process execution unit for performing a process using the detection information calibrated by the calibration unit.

11. The in-vehicle processor of claim 10, further comprising:

a navigation unit for performing a navigation process for the vehicle.

12. The vehicle behavior detector of claim 1, wherein the characteristics change of the autonomous sensor results from at least one of individual sensor difference, environment change, and aged deterioration.

13. The in-vehicle processing system of claim 7, wherein the characteristics change of the autonomous sensor results from at least one of individual sensor difference, environment change, and aged deterioration.

14. The detection information calibrator of claim 8, wherein the characteristics change of the autonomous sensor results from at least one of individual sensor difference, environment change, and aged deterioration.

15. The navigation apparatus of claim 9, wherein the characteristics change of the autonomous sensor results from at least one of individual sensor difference, environment change, and aged deterioration.

16. The in-vehicle processor of claim 10, wherein the characteristics change of the autonomous sensor results from at least one of individual sensor difference, environment change, and aged deterioration.

17. The vehicle behavior detector of claim 1, wherein the calibration unit further includes a Kalman filter for calibrating the detection information.

18. The in-vehicle processing system of claim 7, wherein the calibration unit further includes a Kalman filter for calibrating the detection information.

19. The detection information calibrator of claim 8, wherein the calibration unit further includes a Kalman filter for calibrating the detection information.

20. The navigation apparatus of claim 9, wherein the calibration unit further includes a Kalman filter for calibrating the detection information.

21. The in-vehicle processor of claim 10, wherein the calibration unit further includes a Kalman filter for calibrating the detection information.

22. The vehicle behavior detector of claim 1, wherein the external apparatus includes a vehicle controller that provides vehicle control by using the detection information.

23. The vehicle behavior detector of claim 3, wherein the external apparatus includes a vehicle controller that provides vehicle control by using the detection information.

24. The vehicle behavior detector of claim 4, wherein the external apparatus includes a vehicle controller that provides vehicle control by using the detection information.

25. The detection information calibrator of claim 8, wherein the vehicle controller includes at least one of a navigation apparatus, an AT control apparatus, a meter apparatus, a brake control apparatus, a flight recorder apparatus, a cruise control apparatus, and a Mayday apparatus.

26. The navigation apparatus of claim 9, wherein the vehicle controller includes at least one of an AT control apparatus, a meter apparatus, a brake control apparatus, a flight recorder apparatus, a cruise control apparatus, and a Mayday apparatus.

27. The vehicle behavior detector of claims 2, wherein the autonomous sensor includes a turning state sensor for detecting information relating to a turning state of the vehicle, and wherein the calibration unit calibrates the detection information for learning a neutral position in the turning state sensor.

28. The vehicle behavior detector of claims 3, wherein the autonomous sensor includes a turning state sensor for detecting information relating to a turning state of the vehicle, and wherein the calibration unit calibrates the detection information for learning a neutral position in the turning state sensor.

29. The detection information calibrator of claim 8, wherein the external apparatus is one of a plurality of external apparatuses, wherein the autonomous sensor can detect the information used in the plurality of external apparatuses, wherein the information output unit can output the detection information necessary for each of the plurality of external apparatuses, wherein the external apparatus includes a navigation apparatus, wherein the autonomous sensor includes an autonomous navigation sensor, and wherein the information output unit outputs, to the navigation apparatus, the detection information including at least one of position information of the vehicle and traveling path of the vehicle, both of which are calibrated by the calibration unit.

30. The navigation apparatus of claim 9, wherein the external apparatus is one of a plurality of external apparatuses, wherein the autonomous sensor can detect the information used in the plurality of external apparatuses, and wherein the information output unit can output the detection information necessary for each of the plurality of external apparatuses.

31. The vehicle behavior detector of claim 1, wherein the information obtained by the radio navigation positioning unit includes, with respect to the vehicle, at least one of a position, a bearing, and a speed.

* * * * *